UNITED STATES PATENT OFFICE.

HENRY THAME, OF WINDERS ROAD, HIGH STREET, BATTERSEA, COUNTY OF SURREY, ENGLAND.

GALVANIC BATTERY.

SPECIFICATION forming part of Letters Patent No. 296,365, dated April 8, 1884.

Application filed August 13, 1883. (No specimens.) Patented in England February 3, 1883, No. 598.

*To all whom it may concern:*

Be it known that I, HENRY THAME, a subject of the Queen of Great Britain and Ireland, residing at Winders Road, High Street, Battersea, in the county of Surrey, England, have invented certain new and useful Improvements in Galvanic Batteries; and I do hereby declare the following to be a full, clear, and exact description of the invention, such as will enable others skilled in the art to which it appertains to make and use the same.

This invention relates to improvements in galvanic batteries—such as those in which, like those of the "Bunsen" type, there is a porous diaphragm, two elements and two liquids—but more particularly to the Bunsen, with carbon and zinc plates; and the object is, first, to provide partially, if not wholly, against the effects of polarization, by which the current or flow of electricity is arrested; secondly, to enable the battery to remain longer at work with one charge of liquid; and, thirdly, to prevent partially, if not wholly, the escape of fumes of acid vapor from the apparatus. For instance, in carrying out the invention, I take an ordinary Bunsen element, which I charge in the "outer" zinc or battery cell with the sulphuric-acid solution. The cells I construct with rims or grooves or channels around their upper edges, so that caps or bells can stand within each or either of these grooves, and so as to partially or wholly prevent escape of acid vapor. These grooves are packed with sand and water, or water only, or other suitable packing or sealing. In the crown of the bell or bells are provided holes with packing of asbestus or other material, through which to pass the conductors from the carbon and zinc elements. By these means ready access to the cells may be obtained by the covers thereto being removable at the moment without the delay attendant on the removal of a rigid luting of cement, or such like material, at present employed for preventing the escape of fumes at the junctions of such parts.

The liquid that I charge the carbon-cell with does not consist, as usually is the case, wholly of nitric acid, but is composed of a proportion of that acid mixed with a proportion of the liquid known as "chloro-chromic acid," ($CrO_2Cl_2$;) say, for example, nitric acid three parts, by volume, added to, say, one part, by volume, of the liquid known alternately as "chloro-chromic acid," "oxydichloride of chromium," or "oxychloride of chromium," ($CrO_2Cl_2$.)

The proportions of the nitric acid to the chloro-chromic acid may be considerably varied, and in certain cases it will be found useful to substitute for the nitric-acid sulphuric acid, in which case the proportion of sulphuric acid to the proportion of chloro-chromic acid will be, say, three parts of sulphuric acid to one part of the chloro-chromic acid; but these proportions also may be varied. With the battery thus charged scarcely any polarization is observed, and the arrest of the flow of electricity is avoided, while the duration of working power of the battery is greatly prolonged. The fumes that escape are no longer wholly nitrous-acid gas, but consist in great part of the less hurtful chlorine, and even these fumes are prevented escaping by the covers to the cells of the battery above described. There is also this remarkable property of the battery, that the fumes of chlorine given off are only objectionable when the battery is first charged and put to work, and subsequently appear to be wholly, or nearly so, absorbed within the cell.

I would have it understood that what I claim is—

As the liquid for charging the carbon-cells of galvanic batteries, chloro-chromic acid, known otherwise as "oxydichloride of chromium," "chloro-chromic anhydride," or as "oxychloride of chromium," ($CrO_2Cl_2$,) substantially as and for the purposes described herein.

In testimony whereof I affix my signature in presence of two witnesses.

HENRY THAME.

Witnesses:
ALFRED GEORGE BROOKES,
JAMES PERCY ADAMS.